F. G. ALBORN.
DEMOUNTABLE BODY.
APPLICATION FILED JUNE 16, 1914.

1,288,462.

Patented Dec. 24, 1918.
9 SHEETS—SHEET 2.

Witnesses:
Carl L. Choate.
Llewellyn Richards.

Inventor:
Frans G. Alborn,
by Emery, Booth, Janney & Varney
Attys.

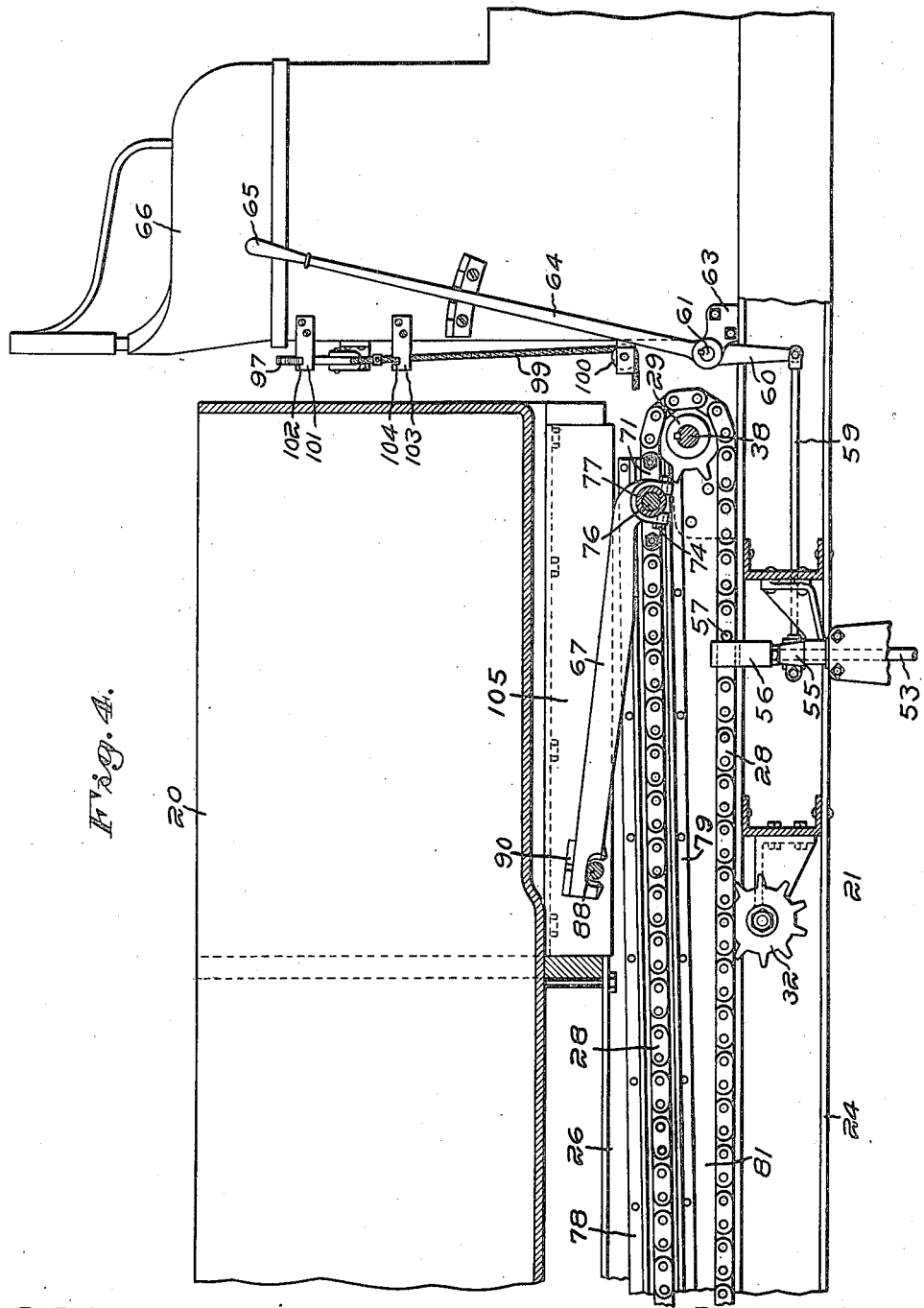

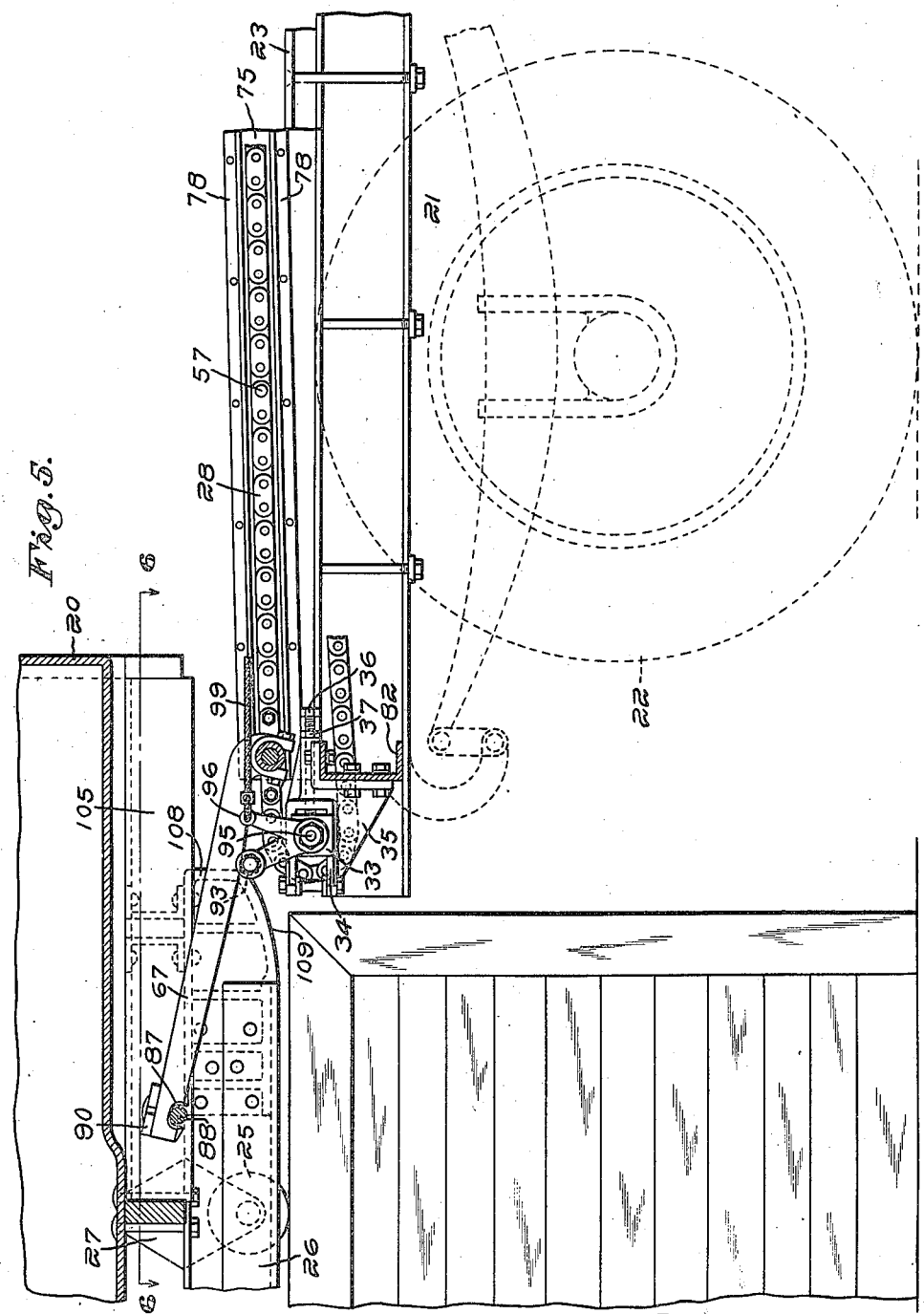

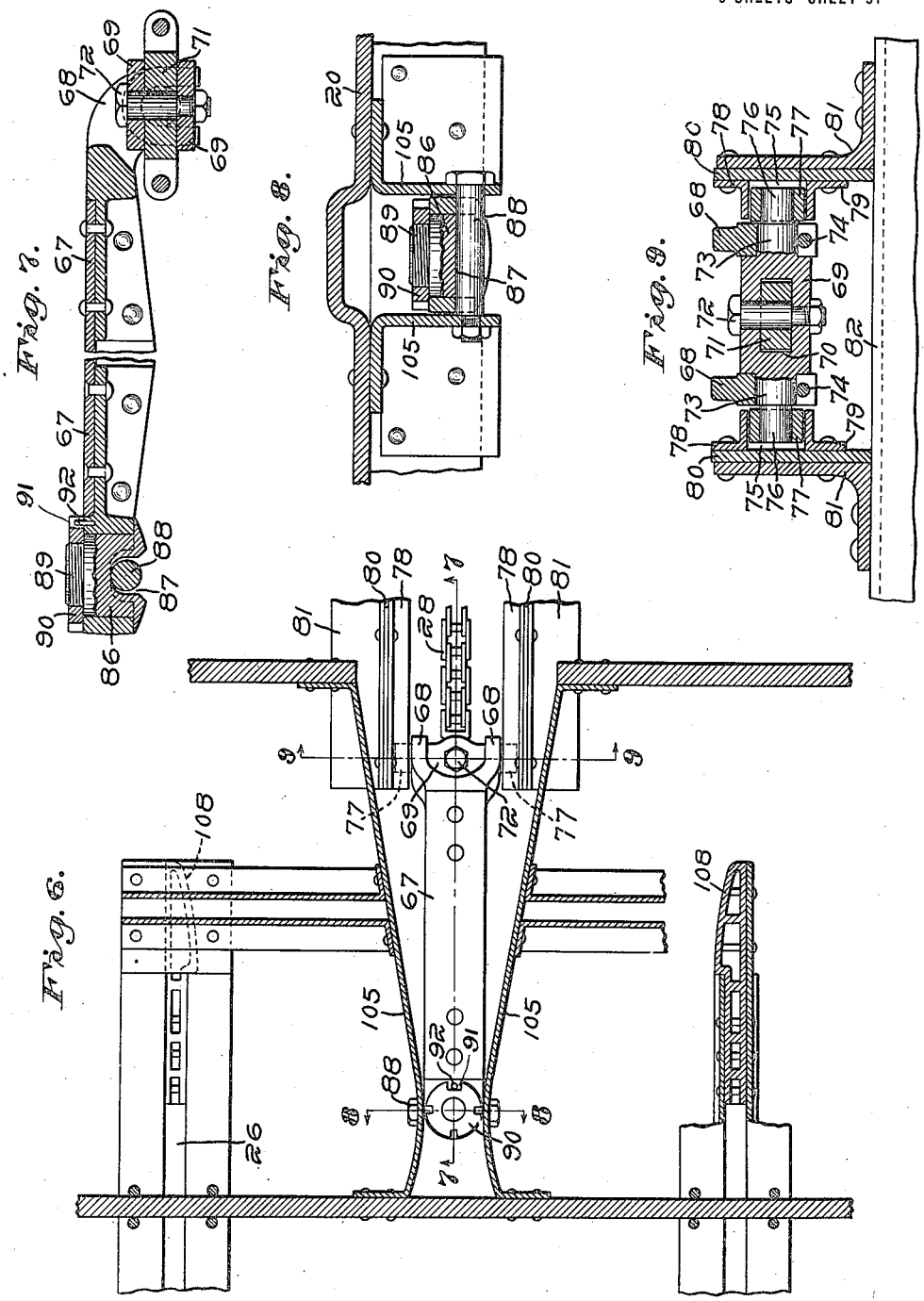

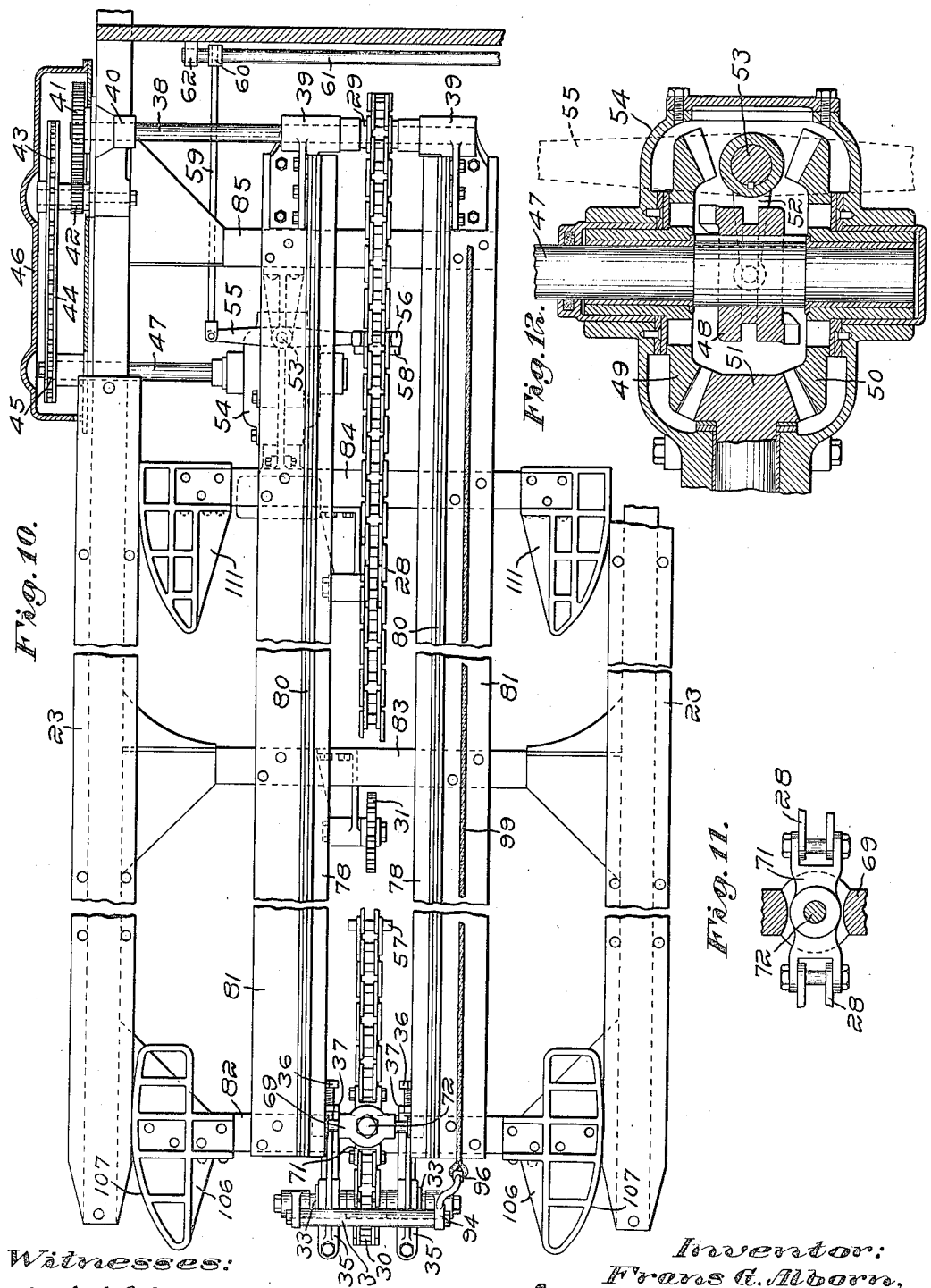

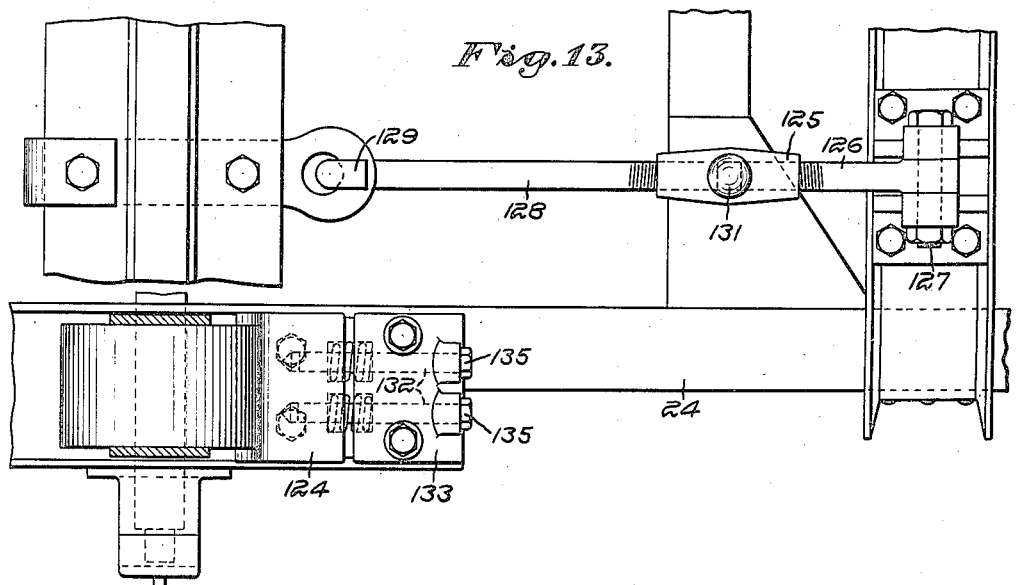
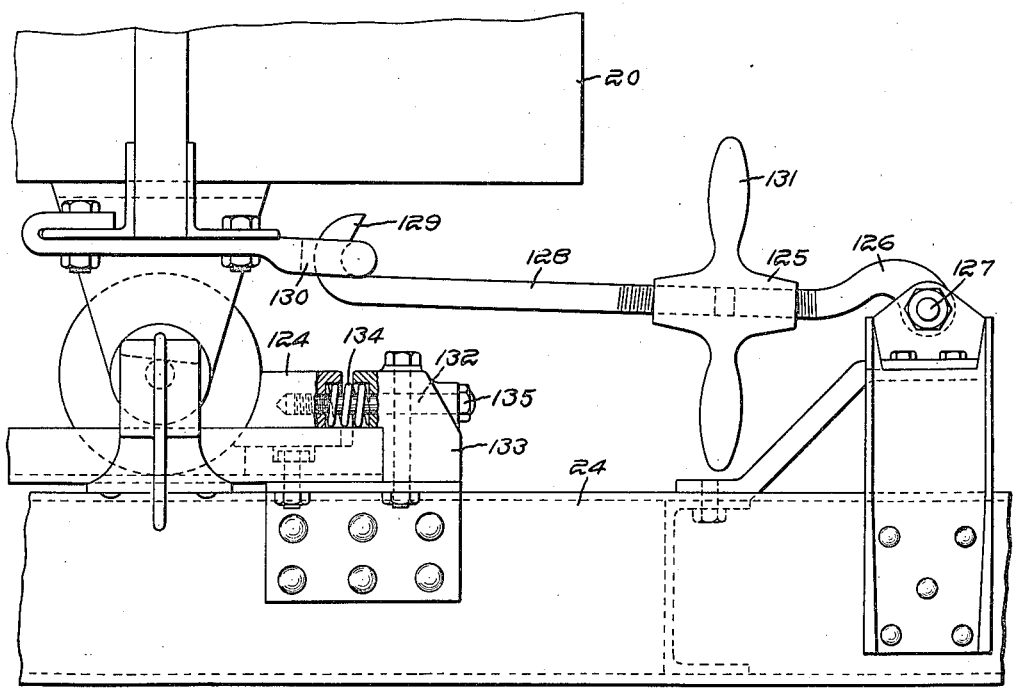

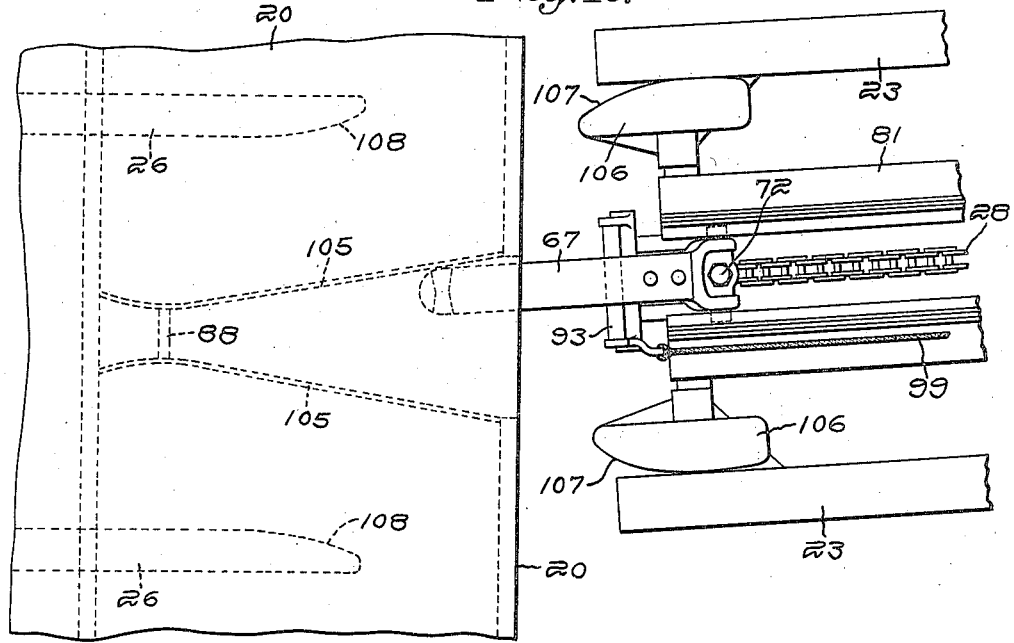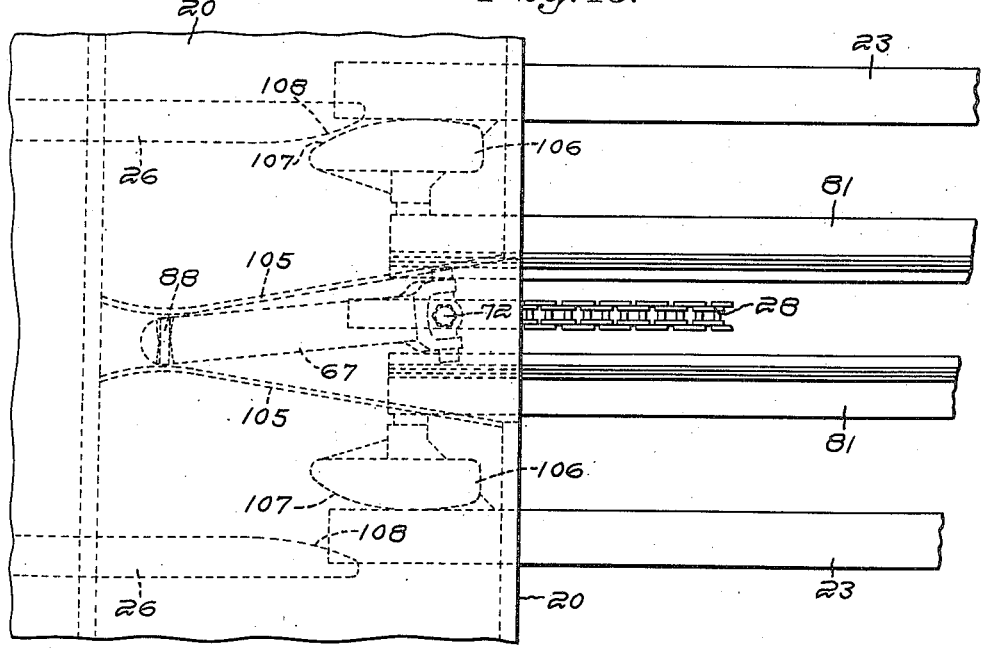

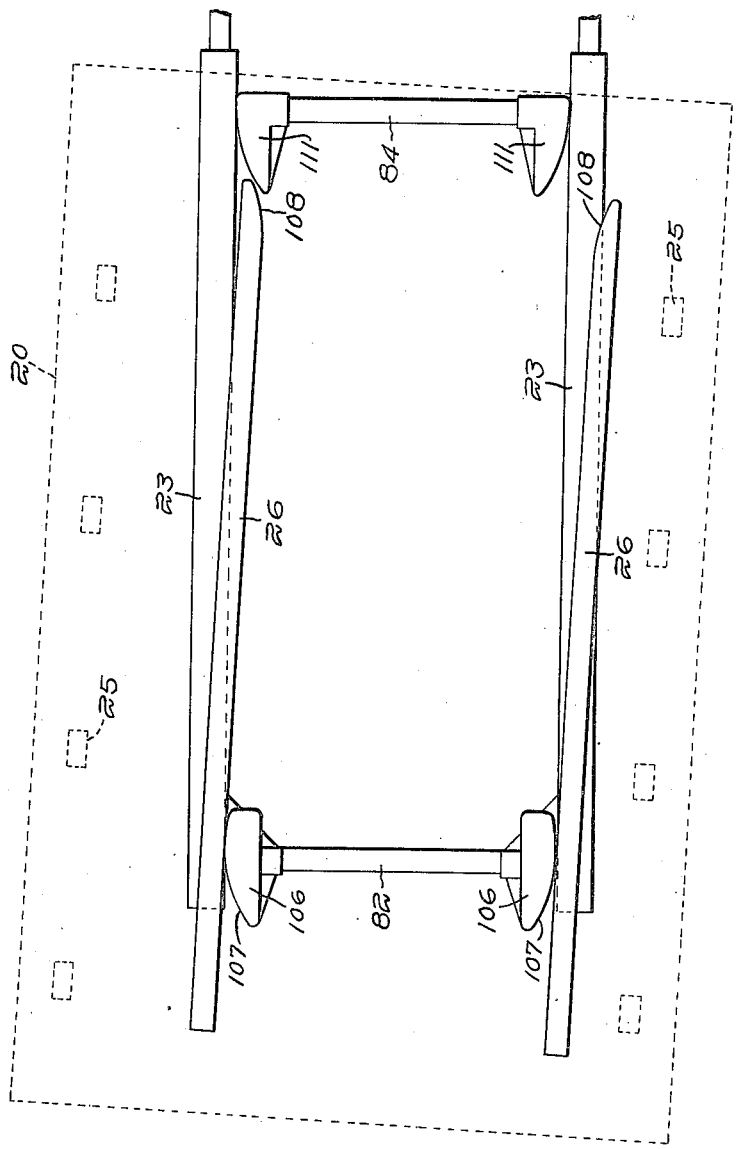

UNITED STATES PATENT OFFICE.

FRANS G. ALBORN, OF BRIDGEPORT, CONNECTICUT, ASSIGNOR TO THE LOCOMOBILE COMPANY OF AMERICA, OF NEW YORK, N. Y., A CORPORATION OF WEST VIRGINIA.

DEMOUNTABLE BODY.

1,288,462.     Specification of Letters Patent.     Patented Dec. 24, 1918.

Application filed June 16, 1914. Serial No. 845,494.

*To all whom it may concern:*

Be it known that I, FRANS G. ALBORN, a subject of the King of Sweden, and a resident of Bridgeport, in the county of Fairfield and State of Connecticut, have invented an Improvement in Demountable Bodies, of which the following description, in connection with the accompanying drawings, is a specification, like characters on the drawings representing like parts.

This invention relates to demountable bodies for vehicles being more especially, though not exclusively, concerned with motor driven vehicles, such as motor trucks, and is intended to increase their economy of operation by decreasing the time required to load and unload the vehicle, thus increasing the proportion of time when the vehicle is in actual operation on the road.

My invention will be best understood by reference to the following specification, when taken in connection with the accompanying drawings of one specific embodiment thereof, while its scope will be more particularly pointed out in the appended claims.

In the drawings:

Fig. 4 is a vertical, longitudinal sectional view of the forward portion of the vehicle, showing the body in its normal position;

Fig. 5 is a vertical, longitudinal sectional view of the rear portion of the vehicle, showing the body on an elevated support, and in driving connection with the body operating mechanism;

Fig. 6 is a plan, sectional view, partly broken away, on line 6—6 of Fig. 5;

Fig. 7 is a central, longitudinal sectional view of the draw-bar, or link, partly broken away, on line 7—7 of Fig. 6;

Fig. 8 is a detail, sectional view on an enlarged scale on line 8—8 of Fig. 6;

Fig. 9 is a detail, sectional view on an enlarged scale on line 9—9 of Fig. 6;

Fig. 10 is a partial plan of the vehicle, with the body removed;

Fig. 11 is a detail plan sectional view, showing a portion of the universal connection or joint between the draw-bar or link and the body-operating chain;

Fig. 12 is a detail plan section on an enlarged scale of the reversing mechanism;

Figs. 13 and 14 are respectively a plan and side elevation of one form of body securing device;

Figs. 15 and 16 are plan views illustrating the operation of connecting the draw-bar or link to the body, Fig. 15 showing the draw-bar being guided toward the point where it is to be connected, and Fig. 16 showing the final position as it appears when connected; and Fig. 17 is a diagrammatic view, illustrating the action of the body-guiding and alinement means.

Figure 1:
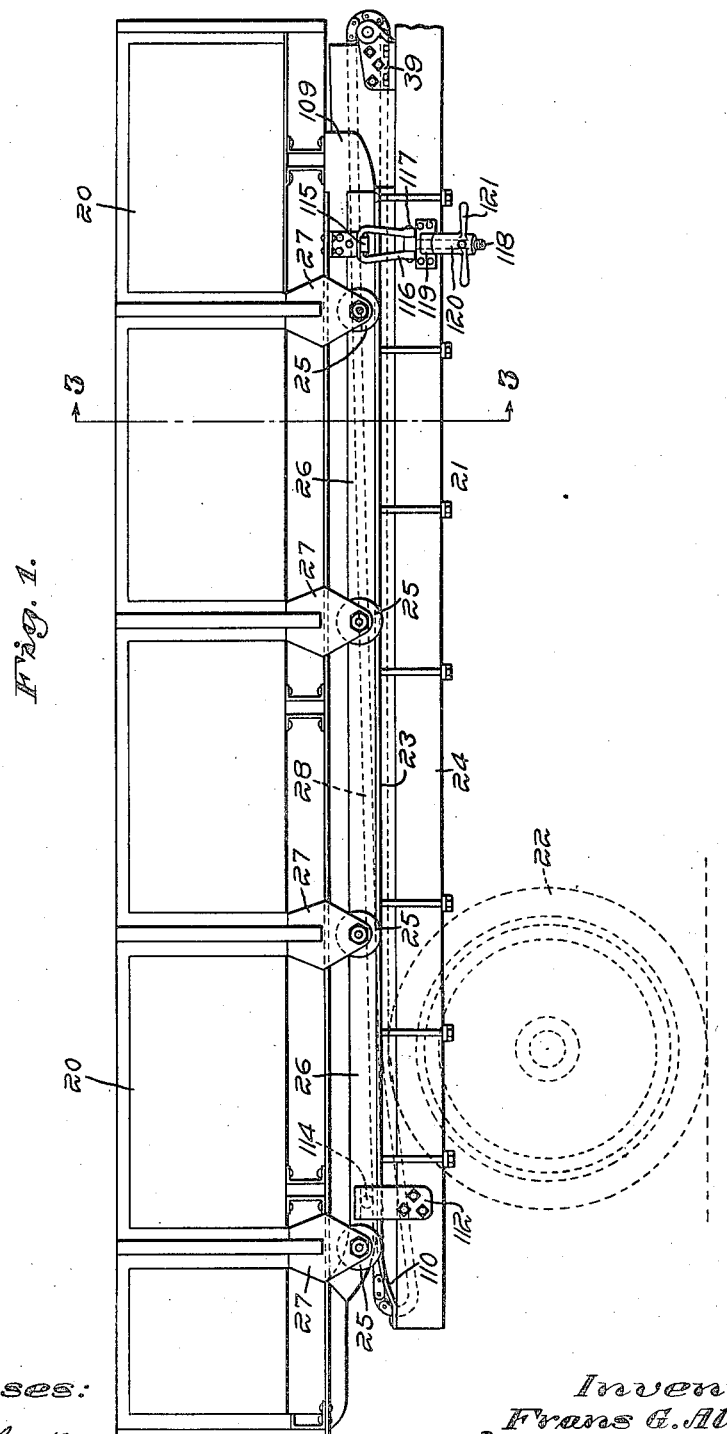
Figure 1 is a side elevation of a portion of a vehicle embodying my invention.
Figure 2:
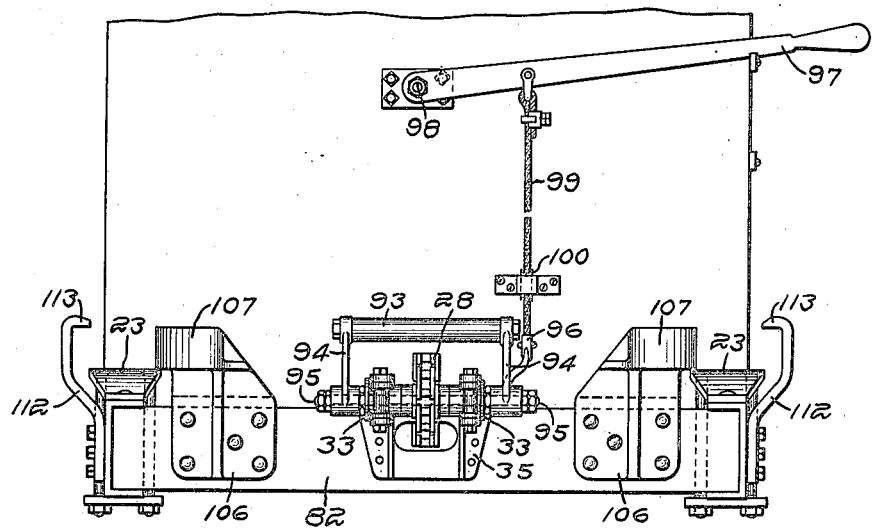
Fig. 2 is a rear elevation of the vehicle with the body removed.

Referring to the drawings, and to the embodiment of my invention which I have selected for illustration, I have there shown a vehicle having a body 20, which may be of any appropriate construction, mounted upon a chassis having a frame 21, the latter being supported in any usual or desired manner on wheels 22. The frame 21 may be provided with any suitable supporting way or ways, as herein exemplified by a pair of ways or rails 23, mounted upon longitudinal members or channels 24, constituting a part of the frame.

The body 20 is herein provided with a plurality of pairs of wheels 25 to support the same on an elevated support when the body is removed from the vehicle, although these wheels may be omitted, if desired. The wheels may be arranged to travel on the supporting ways, as shown in Figs. 13 and 14, but I prefer to utilize them only for supporting the body upon the loading and unloading platform, and to employ a skid or skids 26, to travel on the ways 23 and support the body thereon. In such case, the peripheries of the wheels may, and preferably do, extend beyond the meeting plane of the skid or skids with the supporting way or ways, as will be clearly apparent by an inspection of Figs. 1 and 3, and by preference, the wheels will be disposed outside the skid or skids (see Fig. 3). When thus placed, the wheels will not interfere with any part of the vehicle when the body is drawn onto the latter. The wheels may be otherwise appropriately mounted on the body, but herein each is journaled in a generally U-shaped bracket 27. By employing wheels and skids as described, the body may be conveniently moved about the loading and unloading platform, with its weight resting upon the wheels, while the use of the skids upon the supporting ways possesses several advantages. In the first place, the body has comparatively little tendency to move lengthwise by its inertia as the vehicle stops or starts or varies its speed, or by gravity as the vehicle travels up or down a gradient. Secondly, the use of skids possesses an advantage over the wheels in that the latter would be apt to become flattened, or hammered, in time, owing to the fact that unless the body is firmly clamped onto the ways, the wheels would be apt to hammer the latter, due to the vertical play of the body. Thirdly, the skids have the advantage of facilitating the transfer of the body from the loading and unloading platform to the supporting way or ways, owing to the fact that the body must be brought into alinement with the ways, as it is drawn onto the latter. The body may be caused to travel along the supporting way or ways by any suitable means, or if desired even by hand, but herein I employ for that purpose mechanism which I will now describe.

Disposed lengthwise of the frame, and preferably centrally with relation thereto, is a chain 28, which is herein carried by a driving sprocket wheel 29 and a plurality of idler sprocket wheels 30, 31 and 32. The sprocket wheel 30 is herein rotatably mounted on a pair of blocks 33, adjustably mounted in guideways 34 of a bracket or brackets 35, whereby the tension of the chain may be varied. As a means of adjustment, I have herein provided a pair of adjusting screws 36 (see Figs. 5 and 10), bearing against or connected to the blocks 33, whereby the latter may be conveniently adjusted and held in the selected position of adjustment. The adjusting screws are preferably provided with lock-nuts 37. Herein, the front sprocket wheel 29 is placed at a point somewhat higher than the rear sprocket wheel 30, and the idler sprocket wheels 31 and 32 are employed to avoid interference of the lower lead of the chain with the cross members of the frame.

Power may be supplied to operate the chain through any other appropriate mechanism, but herein the front sprocket wheel 29 is secured to a shaft 38, the latter being journaled in bearings 39 and 40, and having secured to its outer end a gear 41, meshing with a pinion 42. The latter is herein secured to and driven by a sprocket wheel 43, connected by a chain 44 to a sprocket wheel 45. These parts may be and preferably are incased by a housing 46, which will protect them from dust, as well as injury. The sprocket wheel 45 is herein secured to a shaft 47 having splined thereon a jaw clutch member 48, which may be shifted axially into engagement with either of two beveled gears 49 and 50, also constituting clutch members, and driven by a beveled pinion 51 meshing therewith. The clutch member 48 may be shifted into driving engagement with either of the gears 49 and 50, or to an intermediate neutral position, by any appropriate means, as for example a yoke 52 secured to a rock-shaft 53. Herein, the parts just described are inclosed within a housing 54, which constitutes bearings therefor and protects the parts from dust and dirt, as well as forming a receptacle for lubricant.

The rock-shaft 53 herein extends to the outside of the housing 54, and is provided exteriorly thereof with an operating lever 55, having both manual and automatic actuating devices. This lever is herein fulcrumed intermediate its ends, and is provided at one end with a pivoted yoke 56, embracing or straddling the lower lead of the chain 28, and the latter is provided with two pairs of laterally projecting pins or studs 57 and 58, appropriately placed thereon, so that the reversing clutch is capable of being automatically shifted at the ends of the travel of the body in either direction, in case the operator should fail to operate the clutch in time by the use of the manual operating devices, which I will presently describe.

The opposite end of the operating lever 55 is herein connected by a link 59 to an arm 60 secured to a rock-shaft 61 mounted in suitable bearings 62 and 63, and having secured thereto at its outer end a manually operable lever 64, having a handle or grasping portion 65 placed at a convenient point adjacent the driver's seat 66, so that the driver or chauffeur, when at a driving position, has full control of the body operating mechanism.

The body operating chain 28 may be connected to the body by any other appropriate means, but herein a connecting member in the form of a link or drawbar 67 is connected at its respective ends to the body and chain, in such a manner as to be capable of imparting a longitudinal movement to the body while permitting relative lateral or vertical movement of the body and chassis frame. That is to say, the link or draw-bar is capable of accommodating itself to considerable differences in height of the body with relation to the chassis frame, when the body is on an elevated support or is being shifted onto or off the chassis frame from or to the support, and is also capable of accommodating itself to changes in lateral relation between the body and the chassis frame during the operation of transferring the body to or from the elevated support.

Referring now more particularly to Figs.

4 to 11, inclusive, and Figs. 15 and 16, the forward end of the draw-bar or link is herein forked or bifurcated, and is provided with a pair of jaws 68 to receive a block 69 pivoted thereto to swing about a horizontal axis disposed transversely of the vehicle, while the block in turn is appropriately pivoted to the chain 28 in such a manner as to be capable of swinging about a vertical axis. To this end, the block is herein provided with an eye or recess 70, through which there extends a special link 71 of the chain, this link being pivoted to the block by a stud 72 (see Figs. 9 and 11). The block 69 is herein provided with a pair of trunnions 73 extending through the jaws 68, respectively, and as a means for holding the trunnions in place while permitting them to turn, the jaws are herein provided with bolts 74, passing therethrough beneath the trunnions (see Figs. 5 and 9).

Owing to the flexibility of the chain, it is desirable to provide means to maintain the same at a definite height, as well as to prevent it from twisting at its point of connection with the draw-bar, and to that end, I have herein provided a pair of longitudinal guideways 75, which may support and guide the block 69 in any appropriate manner, as by extending the trunnions 73 to form spindles 76, and on these spindles are journaled rollers 77 traveling in the guideways (see Fig. 9). By this means, the chain is prevented from twisting materially, and is held against vertical displacement at the point at which the draw-bar is attached thereto.

The guideways 75 may be otherwise appropriately formed, but herein I employ for this purpose pairs of upper and lower angle irons 78 and 79, secured to longitudinal members 80, the latter being herein secured to angle irons 81 disposed lengthwise of the vehicle, and attached to cross members 82, 83, 84 and 85, forming a part of the frame 21.

The rear end of the draw-bar or link 67 is herein connected to the body by what amounts to a universal connection comprising a stud or block 86, vertically disposed and provided with a jaw 87 to receive a transverse horizontal pin or bolt 88 carried by the body. In order to permit the draw-bar or link to swing horizontally to a limited extent, with relation to the pin 88, the block is mounted to turn about an upright axis. The block may be otherwise appropriately held in place in the terminal portion of the draw-bar, but herein is provided with a reduced portion 89 onto which is threaded a nut 90, having a notch 91 in which is located a pin 92, the arrangement being such that the block is free to turn to the extent necessary to permit the swinging movement of the link in operation. This pin, however, limits the turning movement of the block so that it shall always be in proper position to receive the pin 88, the opening of the jaw 87 for that purpose being herein widened toward its bottom (see Figs. 4, 5 and 7).

As a means for manipulating the draw-bar 67 to cause the same to connect the body to, or disconnect it from, the body-moving mechanism, I have herein provided manually operable means for lifting the draw-bar to cause its disconnection from the body, and for lowering said draw-bar to cause its connection with the body. Such means may be of any other appropriate construction, but herein comprises a species of yoke 93 disposed horizontally transversely of the vehicle, and having a pair of arms 94 pivoted at 95 to the blocks 33, already described. This yoke is capable of supporting the draw-bar, and raising or lowering the same by simply swinging the yoke in the proper direction. To this end, one of its arms is herein provided with a laterally offset arm 96, connected by any appropriate means to an upright handle 97, adjacent the seat 66, whereby the operator, at a driving position, may raise or lower the link to cause it to be disconnected from or connected with the body. Herein the operating handle 97 is in the form of a lever fulcrumed at 98, and appropriately connected to the arm 96 by a flexible member 99 extending downwardly from the lever to the sheave wheel 100, and thence rearwardly in a generally horizontal direction to its point of attachment with the arm 96. The operating lever can be placed and held in either of two definite positions, corresponding to the positions which it is desired the draw-bar shall assume, and to this end, I have herein provided a supporting plate 101 having a notch 102 to receive the lever in its uppermost position, and a supporting plate 103 having a notch 104 to receive the lever in its lowermost position. By simply lifting the lever from its upper notch and moving it slightly in a rearward direction, it may be lowered and placed in the lower notch 104.

Assuming that the previously loaded body is standing on the loading and unloading platform, with its forward end adjacent and preferably slightly overhanging the edge of the platform, it is often a matter of considerable difficulty to back the truck chassis into position where it will be in exact alinement with the body. This condition, then, presents two principal problems to be solved in successfully transferring the body from the loading and unloading platform onto the chassis. One of these is the provision of a convenient mode of moving the draw-bar laterally toward a position where it may be caused to connect the body to the vehicle; the other is that of alining the body with the chassis, as it is drawn onto the latter. The first of these will now be described.

As a means for moving the draw-bar laterally toward a position where it may be caused to connect the body to the vehicle, I have herein provided the body with means having walls 105 which are widely separated at their forward ends and converge rearwardly toward the pin 88, at which point they are preferably spaced apart a distance only slightly greater than the width of the draw-bar (see Fig. 6), thus forming a tapered channel or groove in the under side of the body to guide the rear end of the draw-bar toward a point where it may be connected to the pin. Since it might be a matter of some difficulty to attempt to move the draw-bar rearwardly, or the body forwardly, precisely the right distance to cause the pin 88 to enter the jaw 87, I prefer to make provision whereby the jaw, when lifted, may be caused to pass rearwardly beyond the pin, then lowered, carried forward, and allowed to drop into interlocking engagement with the bolt during the forward motion of the draw-bar. To this end, I have herein extended the guiding walls 105 rearwardly beyond the pin 88, and have made them diverge from the pin toward the rear end of the body. It will now be apparent that the relative preliminary motion of the draw-bar or body may be such as to cause the rear end of the draw-bar, when elevated, to pass beyond the pin, after which the draw-bar may be lowered until it rests upon the pin. Then, when the draw-bar is carried by the operating mechanism toward the other end of the vehicle, it will ride along the pin, and when the jaw is reached, it will drop, and the latter will interengage with the pin and at once commence to draw the body forward.

I have herein provided means whereby the body, although to a considerable degree out of alinement with the chassis, may be drawn onto the latter and brought into alinement therewith, and have found in practice that this may be accomplished successfully, even though at its initial position the body is as much as eighteen degrees out of alinement. The advantage of this will be appreciated, when it is understood that it is practically impossible to back the truck into place so that it shall be in exact, or even fairly approximate, alinement with the body. In the attainment of this result, I have herein provided guiding means permitting the body to be brought partially onto the supporting way or ways, and means subsequently to aline the body with the way or ways. This may take other forms, but herein I have provided at the rear of the chassis frame a pair of guides 106, preferably disposed between the body skids 26, and having guiding surfaces 107, coöperating with the inner surfaces thereof. It will be observed that these guiding surfaces are comparatively short, and have a rounded convergence toward their rear ends, as well as a similar, though lesser, convergence toward their front ends. The inner opposed faces of the skids 26 (see Figs. 6 and 17) are herein flared somewhat, as at 108, to form a converging entrance for the guides 106, so that the body, even though to a considerable extent out of alinement with the chassis, may be drawn onto the latter.

When the body is on the loading and unloading platform, the springs of the vehicle, being relieved of its weight, will naturally lift the chassis frame, so that the supporting guideways will be somewhat above the skids, and the latter are, therefore, preferably provided at their forward ends with upwardly inclined and preferably rounded surfaces 109, and the supporting ways 23 are preferably provided at their rear ends with correspondingly inclined and preferably rounded surfaces 110, so that as the body is drawn onto the chassis, the skids will ride onto the supporting ways, and the latter will gradually descend as the weight of the body is transferred from the loading and unloading platform to the chassis. As the body is carried forward, it will often, at first, be considerably out of alinement with the chassis, but owing to its attachment to the draw-bar, which is carrying it forward, the latter will have a natural tendency to bring the body into alinement with the chassis, but I have herein provided at the forward portion of the chassis frame a pair of guides 111, similar to the guides 106 already described, and arranged to coöperate with the flared entering surfaces 108 of the skids 26, to force the latter toward one side or the other as the body is drawn forward, thus utilizing its forward motion to aline it with the supporting way or ways. It will now be evident that, when the body finally reaches its foremost position, it will be fully alined with the chassis. As the vehicle passes over inequalities of the road, there will naturally be a tendency for the body to play up and down with relation to the chassis. To prevent this, I have herein provided both ends of the chassis with appropriate means for holding the body against upward movement. In the present instance, I have provided at the rear a pair of brackets 112, having inwardly projecting flanges 113, which overhang laterally projecting pins 114 secured to the body, the arrangement being such that as the body is drawn onto the chassis, these pins pass beneath the flanges and prevent the body from rising at that point. At the forward end of the chassis, I have herein provided means for clamping the body thereto. This clamping means may take different forms; in the preferred form of my invention, where the skids rest upon the supporting ways, the clamps are arranged to draw the skids in a downward direction against the supporting ways (see Figs. 1 and 3); while in the form shown in Figs. 13 and 14, where the wheels or rollers of the body travel on the supporting ways, the clamping devices serve to hold the forward wheels against stops, which may be in the form of buffers.

Figure 3:
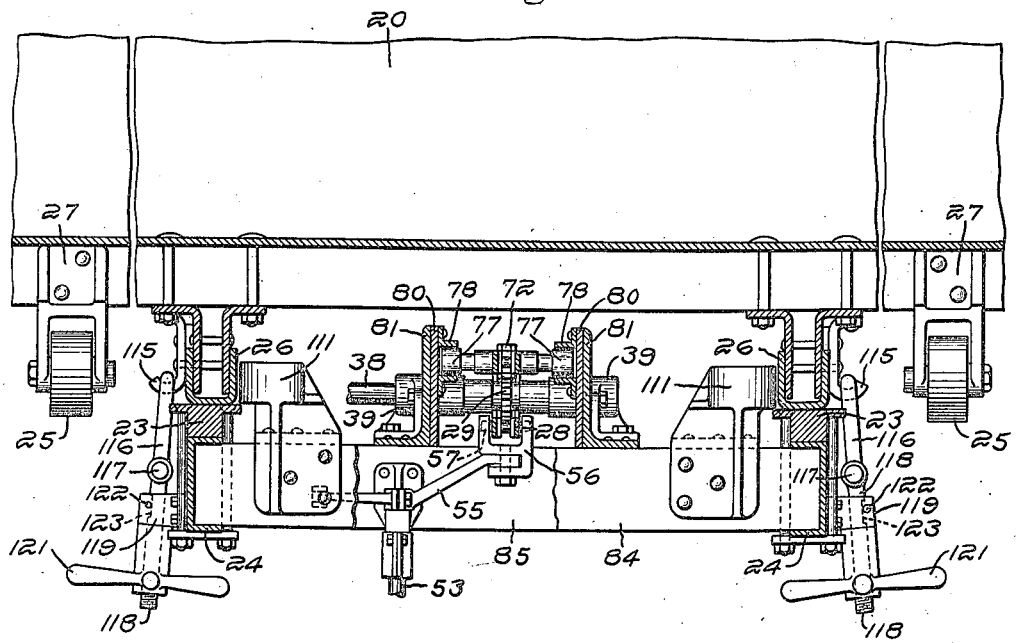
Fig. 3 is a cross sectional view, partly broken away, on line 3—3 of Fig. 1.

Referring now to the form shown in Figs. 1 and 3, the body is herein provided with a laterally projecting upwardly turned hook 115, which receives an eye or shackle 116, the latter being pivoted at 117 to a threaded rod 118 extending through an ear on the bracket 119, and having beneath the latter a nut 120, by means of which the shackle may be moved up or down at will, thereby to clamp the body to, or release it from, the guideways. It will be understood that when the shackles are elevated, they may swing laterally out of engagement with the hooks 115, to permit the body to be moved lengthwise. The nut 120 is preferably provided with one or more, herein several, handles 121, whereby it may be turned without the use of a wrench. As a means for preventing the threaded rods 118 from rotating in the brackets 119, I have herein provided the latter with pins 122, engaging flattened surfaces 123 on the rods (see Fig. 3).

Referring now to the form shown in Figs. 13 and 14, in this instance I have provided spring buffers 124, to limit the forward motion of the body wheels or rollers, and have provided means to hold the wheels against the buffers, such means herein comprising a right and left-threaded sleeve nut 125, threaded at one end onto a rod 126 pivoted at 127 to the frame, the other end of the sleeve nut being threaded onto a rod 128 having a hook-shaped terminal portion 129 hooked into an eye 130 secured to the body. The sleeve nut is herein provided with a plurality of handles 131, by means of which it may be rotated without the use of a wrench.

The body may be released by simply rotating the sleeve nut in the proper direction, to free the hook 129 from the eye 130, and may be again secured by a reversal of the same operation. It will now be apparent that the body may be secured in its normal position against lengthwise movement, by operating the described clamping device to draw the body wheels or rollers against the stops or buffers.

The body stops or buffers may be otherwise appropriately constructed, but herein they are mounted to slide lengthwise and are provided with one or more, herein two, rods 132, passing through a bracket 133, and encircled by springs 134 interposed between the brackets and buffers in such a manner as to yieldingly resist their forward motion. The rearward motion of the buffers is herein limited by nuts 135, threaded onto the rods 132.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to procure is:—

1. A load-handling apparatus comprising, in combination, a vehicle having a supporting way or ways; a body having means to travel thereon; guiding means permitting the body to be brought onto said way or ways misalined into position where the ways alone provide for supporting the same in stable equilibrium thereon; and means subsequently to aline said body with said way or ways.

2. A load-handling apparatus comprising, in combination, a vehicle having a supporting way or ways; a body adapted to travel thereon; coöperating guiding means on said body and said vehicle to guide said body onto said vehicle into position where the ways alone provide for supporting the same in stable equilibrium thereon yet permitting a misalined relation between them; and means subsequently to aline said body with said vehicle.

3. A load-handling apparatus comprising, in combination, a vehicle having a supporting way or ways; a body adapted to travel thereon; coöperating preliminary guiding means on said body and said vehicle to guide said body onto said vehicle into position where the ways alone provide for supporting the same in stable equilibrium thereon, yet permitting a misalined relation between them; and means consequent upon further movement of said body to aline said body with said vehicle.

4. A load-handling apparatus comprising, in combination, a vehicle having a supporting way or ways; a body adapted to travel thereon; guiding means preliminarily to guide said body onto said ways into position where the ways alone provide for supporting the same in stable equilibrium thereon while permitting a misalined relation between them; and means for utilizing further movement of the body onto said ways to aline said body therewith.

5. A load handling apparatus comprising, in combination, a vehicle having one or more supporting ways, a body receivable thereon having longitudinal guides and coöperating, alined guiding elements adjacent front and rear of the vehicle respectively and the latter adapted for substantially point contact with said guides whereby misalinement is permitted until the body is home on the ways.

6. A load handling apparatus comprising, in combination, a vehicle having one or more supporting ways, a body receivable thereon having longitudinal guides, means to exert draft on the body longitudinally of the ways, a pair of guide blocks adjacent the rear of the vehicle having opposed curved faces, each rearwardly diverging from the coöperating guide, and guide blocks at the front of the vehicle having opposed faces rearwardly diverging from the coöperating guide.

7. A load handling apparatus comprising, in combination, a vehicle having one or more supporting ways, a body receivable thereon having longitudinal guides, means to exert draft on the body longitudinally of the ways, means adjacent the rear of the vehicle providing lateral point contact for said guides and guide means adjacent the front of the vehicle laterally engaging said guides.

8. An apparatus as defined in claim 7 wherein the guides have oblique surfaces coöperating with the guide means.

9. An apparatus as defined in claim 7 wherein the said guide means present oblique surfaces for coöperation with the guides.

10. A load-handling apparatus comprising, in combination, a vehicle; a body; means to move said body onto or off said vehicle including a connecting member; and guide means for utilizing relative movement of said body and said vehicle to move said member toward a position where it may be caused to connect said body to said vehicle.

11. A load-handling apparatus comprising, in combination, a vehicle; a body; means to move said body onto or off said vehicle including a connecting member; and means for utilizing relative movement of said body and said vehicle to move said member laterally toward a position where it may be caused to connect said body to said vehicle.

12. A load-handling apparatus comprising, in combination, a vehicle; a body; means to move said body onto or off said vehicle including a connecting member; and means for utilizing relative movement of said body and said member to move said member laterally toward a position where it may be caused to connect said body to said vehicle.

13. A load-handling apparatus comprising, in combination, a vehicle; a body; means to move said body onto or off said vehicle including a connecting member; and means having converging walls to move said member laterally toward a position where it may be caused to connect said body to said vehicle.

14. A load-handling apparatus comprising, in combination, a vehicle; a body; means to move said body onto or off said vehicle including a connecting member having one end permanently connected to said vehicle and the other detachably connected to said body; and means on said body having converging walls to guide said member toward a position where it may be caused to connect said body to said vehicle.

15. A load-handling apparatus comprising, in combination, a vehicle; a body; means to move said body onto or off said vehicle including a connecting member; and means on said body having walls converging toward a point where said member may be caused to connect said body to said vehicle.

16. A load-handling apparatus comprising, in combination, a vehicle; a body; means to move said body onto or off said vehicle including a connecting member; and means for moving said member to cause the same to connect said body to or disconnect it from the body moving means, the second-mentioned means including a manually operable member located adjacent the front of the vehicle, and a connection between said members.

17. A load-handling apparatus comprising, in combination, a vehicle; a body; means to move said body onto or off said vehicle including a connecting member; and means for moving said member to cause the same to connect said body to or disconnect it from the body moving means, the second-mentioned means comprising an actuating member adjacent the rear of the vehicle, a manually operable member adjacent the front of the vehicle and a connection therebetween.

In testimony whereof, I have signed my name to this specification, in the presence of two subscribing witnesses.

FRANS G. ALBORN.

Witnesses:
 JOHN B. LAWRENCE,
 JOHN J. ZELLER.